United States Patent Office 3,311,505
Patented Mar. 28, 1967

3,311,505
GAS ELECTRODES AND THEIR FABRICATION
Michel Paget, Neuilly-sur-Seine, and Odile Bloch, Meudon, France, assignors to Institut Francais du Petrole, des Carburants et Lubrifiants, Rueil-Malmaison, Seine-et-Oise, France
No Drawing. Filed Sept. 1, 1964, Ser. No. 393,762
8 Claims. (Cl. 136—86)

It is known that battery performance is limited by the quality of the electrodes. Active carbon gas electrodes give fairly satisfactory results but their mechanical brittleness makes it necessary to use very thick electrodes. Sintered metals possess better mechanical strength but are insufficiently active especially as oxygen electrodes (nickel, for example) or are expensive (e.g. silver and, especially, platinum).

It is an object of the electrode according to the present invention to have satisfactory mechanical strength and activity. This electrode can also be manufactured at low cost.

This electrode is more particularly usable in an alkaline, neutral or slightly acid medium. It is basically composed of a sintered metal substratum, preferably of nickel, though it could be iron or cobalt or even stainless steel, and of a carbon deposit obtained by heating the substratum in contact with a hydrocarbon at a hydrocarbon cracking temperature.

Not all sintered metal substrata are the same. A substratum which is particularly active and which is preferred for the invention is obtained by sintering a nickel, cobalt or iron powder obtained by thermal decomposition of the corresponding metal carbonyl. Such decomposition is usually carried out at a fairly low temperature (e.g. 50 to 250° C.) chosen in terms of the decomposition temperature of the carbonyl compound.

The powder obtained is then sintered by heating under pressure, preferably in the presence of a gelling agent, for instance carboxymethylcellulose or methylcellulose.

The metal powder can be mixed with the gelling agent and water. The resultant paste can be shaped, for instance by hot rolling, at about 100 to 150° C. The strip obtained is then heated, screened from air, at a temperature of about 300 to 600° C.

Also, a mixture of nickel powder and a bond (e.g. carboxymethylcellulose, methylcellulose or stearic acid) can be tightly compressed. The compressed tablets obtained are then heated, screened from air, at about 300 to 600° C.

Sintering metals is well known in the art.

It is preferable for the substratum not to contain any carbon of foreign origin when it is subjected to the carbon deposit treatment of the invention.

It is an advantage for the substratum to possess a high porous volume, for instance around 40 to 80% of its apparent volume. The porous volume can be determined by means of a mercury porosimeter. The average pore diameter should preferably be between 5 and 25 microns, particularly between 10 and 15 microns. Advantageously, at least 80% of the porous volume should correspond to pores with diameters varying by less than 50% of the average diameter, on either side.

The average diameter is the one that corresponds to the highest frequency. It is determined by tracing the curve representing the porous volume in terms of the pore diameter. The maximum of the curve correpsonds to the average diameter.

The nature of the hydrocarbon subjected to cracking is not determinant, and the cracking temperature is chosen in terms of the nature of the hydrocarbon, for example between 400 and 1000° C., bearing in mind that light hydrocarbons ($CH_4$ for example) generally necessitate higher temperatures than heavy hydrocarbons. With propane, for instance, an average temperature around 500 to 700° C. is generally satisfactory. Other hydrocarbons that can be used are, for example, ethane, hexane, dodecane, eicosane and cyclohexane.

The hydrocarbon can be used in the form of an individual pure chemical or in the form of a mixture of hydrocarbons, in particular a cut of distilled or refined petroleum, or a natural gas.

The hydrocarbon may be diluted by an inert gas such as nitrogen or argon. Particular preference is given to mixtures containing 25 to 75% hydrocarbons, the rest being an inert gas.

The treatment is stopped when the desired proportion of carbon is deposited on the substratum. This proportion may, for example, exceed 0.1% and attain 1 to 20% of the weight of the substratum, preferably 2 to 5% of that weight. In general, this result is obtained in 5 to 60 minutes.

As the sintered metal, particularly sintered cobalt or nickel, itself promotes hydrocarbon cracking, it is generally useless to add another usual cracking catalyst.

However, an active catalytic metal, such as nickel or cobalt, could be deposited on the support, for instance by impregnating the support with an aqueous solution of a nickel or cobalt salt, with subsequent reduction of the salt into nickel or cobalt metal, using known techniques for making catalysts, or again by electrolytic deposit using an aqueous solution of a nickel or cobalt salt.

The electrode thus obtained is allowed to cool in an inert atmosphere.

Deposits of catalytic metals, in particular silver, gold or a platinum group metal, can optionally be effected following the above-mentioned treatments. This results in an increased efficiency as oxygen electrode. Deposits of a platinum group metal, an iron group metal (especially Ni and Co) or copper are more convenient for fuel gas electrodes.

By platinum group metals are meant ruthenium, rhodium, palladium, osmium, iridium and preferably platinum.

Such deposits are made by processes which are well known in the arts of catalyst manufacturing and electroplating.

With the above electrodes, it is necessary to use the gases under pressures slightly above the electrolyte pressure, in order to avoid excessive wetting of the electrode by the electrolyte. This results in a bubbling of the gas through the electrolyte. In some cases such bubbling is undesired. It is then possible to protect the electrolyte face of the electrode by a layer of matter which is permeable to electrolytes and not to gases. Microporous matters, especially with pore diameters lower than 5 microns and preferably comprised between 0.1 and 2 microns, are suitable. They can be made of any inert matter, for example polyethylene or polyvinyl chloride. Such plastic layers can be applied onto the electrodes by mere pressure.

The following non-limitative examples illustrate how the invention is applied.

*Example 1*

Sintered nickel disks are used, their porous volume being equal to 51% of their apparent volume and the average pore diameter being 15 microns. These disks are obtained by sintering at around 450° C. a nickel powder (grains of 3 to 7 microns) obtained by decomposing nickel carbonyl at around 180° C., to which stearic acid is added. The diameters of all the pores of the disks are between 10 and 20 microns.

Disks of this sintered nickel, with a unit diameter of 3 cm. and a thickness of 2 mm., are placed in a furnace brought to 650° C., in which a gaseous mixture of equal volumes of propane and nitrogen is circulating at the rate of 130 cm.³/minute (volume referred to 0° C. and 760 mm. of mercury).

After 20 minutes, the pellets are allowed to cool in a nitrogen atmosphere, to avoid their oxidation. It is found that the carbon deposit on the pellets corresponds to 5% of their initial weight.

To appraise the qualities of the electrodes thus obtained, they have been used as oxygen electrodes in an electrolysis cell containing 6 N potassium hydroxide. At a temperature of 21° C. this gave a current density of 250 ma./cm.² for an electrode potential of −200 mv. as compared with the normal hydrogen electrode. The other electrode was made of a platinum sheet.

Example 2

This example is given as a comparison.

Example 1 is repeated, using usual nickel powder for making the disks.

The porous volume represents 65% of the apparent volume.

The average diameter of the pores is 35 microns.

A current density of only 110 ma./cm.² is obtained for an electrode potential of −200 mv. compared with the normal hydrogen electrode.

Example 3

Example 1 is repeated using sintered nickel (obtained from nickel carbonyl) with a porous volume equal to 70% of its apparent volume and an average pore diameter of 12 microns. 85% of the porous volume corresponds to pores with diameters between 10 and 13 microns.

The diameter of the disks is 3 cm. and their thickness is 1 mm.

The current density attained is 285 ma./cm.² for an electrode potential of −200 mv. compared with the normal hydrogen electrode.

Example 4

Example 1 is repeated, but the propane is replaced by n. butane and the temperature of treatment with the butane-nitrogen mixture is 575° C.

With the resultant disks, a current density of 235 ma./cm.² is obtained for an electrode potential of −200 mv. as compared with the normal hydrogen electrode.

Example 5

Example 1 was repeated but the oxygen electrode was fed with air instead of oxygen. The current density was only 150 ma./cm.², the electrode potential being unchanged.

Example 6

The electrode of Example 1 was used as oxygen electrode in a fuel cell containing 6 N potassium hydroxide at 20° C. The second electrode was of the same kind but had been further immersed in a chloroplatinic acid aqueous solution, dried and heated up to 450° C. in hydrogen.

The thus obtained platinum deposit amounted to 6 mg. Said second electrode was fed with hydrogen.

The pressure on the electrolyte was atmospheric, whereas the overpressure of the gases was cm. Hg.

The cell gave 250 ma./cm.² under 500 mv.

Example 7

Example 6 was repeated but the electrodes had been protected on their electrolyte face by a layer of polyvinyl chloride with 1.5 micron pores. The cell gave 100 ma./cm.² under 500 mv.

What we claim is:
1. In combination with a fuel cell, a gas electrode comprising a sintered metal substratum, said metal being selected from the group consisting of cobalt, nickel and iron, and a surface deposit of carbonaceous matter obtained by heating the substratum in a hydrocarbon atmosphere, at hydrocarbon cracking temperature, the said substratum being obtained by sintering a metal from the group consisting of iron, nickel, and cobalt resulting from the thermal decomposition of iron carbonyl, nickel carbonyl, cobalt carbonyl respectively, said substratum having a porous volume representing 40 to 80% of its apparent volume and an average pore diameter between 5 and 25 microns.

2. In combination with a fuel cell, a gas electrode according to claim 1, in which the deposit of carbonaceous matter represents at least 0.1% of the weight of the substratum.

3. In combination with a fuel cell, a gas electrode according to claim 1, in which the deposit of carbonaceous matter represents 1 to 20% of the weight of the substratum.

4. In combination with a fuel cell, a gas electrode according to claim 1, in which the average pore diameter is between 10 and 15 microns.

5. In combination with a fuel cell, a gas electrode according to claim 1, in which the deposit of carbonaceous matter has been effected at a temperature between 400 and 1000° C.

6. In combination with a fuel cell, a gas electrode according to claim 1, in which the decomposition of the metal carbonyl has been carried out at a temperature between 50 and 250° C.

7. In combination with a fuel cell, a gas electrode according to claim 1 on which is deposited a metal selected from the group consisting of silver, gold, a platinum group metal and an iron group metal.

8. In combination with a fuel cell, a gas electrode according to claim 1, in which at least 80% of the porous volume corresponds to pores with diameters varying by less than 50% of the average diameter, on either side.

References Cited by the Examiner

UNITED STATES PATENTS

| | | | |
|---|---|---|---|
| 606,843 | 7/1898 | Mond | 117—100 |
| 2,154,312 | 4/1939 | MacCallum | 136—121 |
| 2,198,042 | 4/1940 | Schlecht et al. | 136—28 |
| 2,672,494 | 3/1954 | Fleischer | 136—28 |
| 3,097,974 | 7/1963 | McEvoy et al. | 136—86 |

FOREIGN PATENTS 1,116,287  11/1961  Germany.

WINSTON A. DOUGLAS, *Primary Examiner.*
ALLEN B. CURTIS, A. SKAPARS,
*Assistant Examiners.*